Dec. 12, 1961 B. A. ANTISTA 3,013,162

FULL-WAVE TRANSISTORIZED SWITCH

Filed Jan. 19, 1959 2 Sheets-Sheet 1

INVENTOR.
BART A. ANTISTA

BY Allan Rothenberg

ATTORNEY

Dec. 12, 1961 B. A. ANTISTA 3,013,162

FULL-WAVE TRANSISTORIZED SWITCH

Filed Jan. 19, 1959 2 Sheets-Sheet 2

INVENTOR.
BART A. ANTISTA

BY Allan Rothenberg

ATTORNEY

United States Patent Office 3,013,162
Patented Dec. 12, 1961

3,013,162

FULL-WAVE TRANSISTORIZED SWITCH

Bart A. Antista, Whittier, Calif., assignor to North American Aviation, Inc.

Filed Jan. 19, 1959, Ser. No. 787,687
7 Claims. (Cl. 307—88.5)

This invention relates to transistorized switching circuits, and more particularly to circuits for electronically effecting selective or variable repetitive switching.

Certain applications such as, for example, those employing a time division multiplication require switching circuits of broad frequency ranges capable of operation over widely variable duty cycles. Previously used full-wave transistorized switches such as the Bright switch, for example, require multiple transistors of different types and switching signal transformers. The use of a large number of transistors is, of course, undesirable, and further the required switching transformer lacks efficiency in variable duty cycle operation to thereby impose intolerable restrictions upon both upper and lower frequency limits.

It is accordingly an object of this invention to provide a simplified switch of extended frequency range operable over wide variations of its duty cycle.

According to an embodiment of this invention, a switching signal not floating, but referenced to a point of common potential, is utilized to alternately turn on and off a pair of switching transistors which are each connected in respective ones of a pair of unidirectional current paths provided between the point of common potential and opposite ends of a transformer winding. Current bias which cancels in the winding is provided for each path and also provides proper operating potentials for the transistors whereby superior switching at low levels may be achieved for signals applied to modulate the bias currents. External circuits are coupled to the transformer and between the current bias source and the point of fixed potential to thereby eliminate transformer coupling of the switching signal and achieve full-wave operation with but a single pair of transistors. Depending upon the nature of the two external circuits, the same switching circuit may alternatively be utilized as a detector or as a modulator.

An object of this invention is to provide an improved switching circuit.

A further object is to effect electronic switching over a widely variable duty cycle.

Still another object is to provide a switching circuit utilizing a switching signal which is referenced to a fixed potential.

Another object of the invention is to extend the low frequency range of operation of an electronic switch.

Another object of the invention is to provide a full-wave transistorized switch operable for time division multiplication.

A further object of the invention is the provision of a switching circuit alternatively operable as a multiplier, detector or modulator.

These and other objects of this invention will become apparent from the following description taken in connection with the accompanying drawings wherein.

In the drawings, like reference characters refer to like parts.

Figure 1:
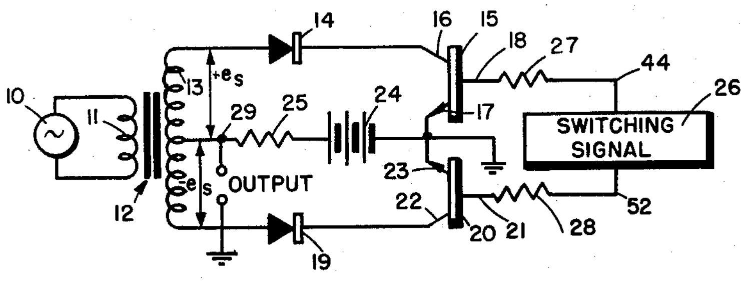
FIG. 1 illustrates an embodiment of the invention capable as use of a multiplier.

As illustrated in FIG. 1, a switching circuit utilized for variable duty cycle switching, such as in time division multiplication, is connected to a first external input circuit such as a source of alternating current 10 through a primary winding 11 of a transformer 12. The transformer 12 has its secondary winding 13 connected to a point of common potential, such as the ground illustrated, through a pair of unidirectional current paths. The first path includes a diode 14 and a switching transistor 15. The switching transistor has a pair of switching electrodes here illustrated as the collector 16 and emitter 17 and a control electrode or base 18. The transistor 15, which is an n-p-n transistor, has one of its switching electrodes, collector 16, connected to the cathode of diode 14 and the other of its switching electrodes, emitter 17, connected to the point of common potential whereby the switching electrodes of the transistor are series connected in the first unidirectional current path. The second unidirectional current path coupling the other end of winding 13 to ground similarly includes a diode 19 and a switching transistor 20 having a control electrode or base 21 and a pair of switching electrodes comprising collector 22 and emitter 23 series connected in the second current path.

A source of bias current 24 is connected through resistor 25 to a center tap of winding 13 to provide a bias current in the winding in such a direction as to establish proper operating potentials on the transistor collectors. The bias current flowing in the two current paths flows in opposite directions through winding 13 and thus produces no net signal therein.

A source 26 of switching signal is coupled to the transistor bases 18 and 21 through base current establishing resistors 27 and 28. The switching signal from source 26, more particularly described below, varies about the point of common potential. The two outputs of the source 26 are of mutually opposite polarity such that when the base 18 is driven positive the base 21 is driven negative whereby transistor 15 is turned on (conducting) when transistor 20 is turned off (non-conducting). Similarly, transistor 20 is turned on when transistor 15 is turned off. A load, or second external circuit, is coupled between point 29, at the center tap of winding 13, and the point of common potential or ground.

If transistor 15 is on, and the input from the primary winding 11 is such as to provide a voltage positive $e_s$ between the center tap and the upper end of winding 13, and a voltage negative $e_s$ in the lower half of the winding 13 (i.e., a total of $2e_s$ across winding 13), the voltage applied to the collector of transistor 15 is $E+e_s$ where E is the positive direct-current bias voltage. The voltage E is made larger than the peak value of $e_s$ whereby the applied collector voltage on transistor 15 is always positive and current will always flow into the collector of the transistor to thus provide the necessary operating condition for such n-p-n transistor. Under these conditions, current is flowing in the forward direction through diode 14. During this part of the cycle the voltage from the lower end of the winding 13 to ground (through diode 14 and conducting transistor 15) is $2e_s$ assuming a negligible voltage drop across the diode and transistor during conduction. Transistor 20, which is cut off, is protected from the negative potential appearing at the lower end of winding 13 by the diode 19. Transistor 20 is capable of blocking the positive half-cycle of the input voltage when the transistor is turned off and the lower end of winding 13 is relatively positive. Thus, the maximum voltage which can be switched is limited by the back voltage ratings of the diodes 14 and 19 and the transistor collector voltage ratings.

During the time that transistor 15 is conducting, the voltage appearing across resistor 25 is $E+e_s$ and thus the voltage from the output terminal 29 to ground is negative $e_s$, again assuming negligible drop across the conducting diode. Now assuming the same polarity of input voltage from the primary 11, and assuming the transistor 20 is turned on and transistor 15 is turned off, current passes through the lower path including diode 19 (since E is greater than $e_s$) while transistor 15 blocks the voltage from the upper end of the winding 13. Under these conditions, the output voltage at terminal 29 with respect to ground is $+e_s$. Similar considerations apply for the other half cycle of source 10 when the lower end of winding 13 is positive relative to its upper end.

Figure 2:
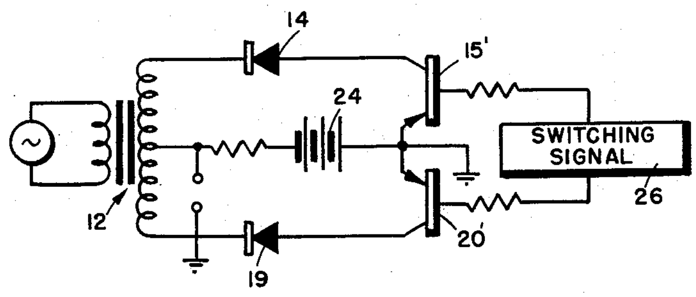
FIG. 2 illustrates the embodiment of FIG. 1 with certain modifications thereof.

The circuit configuration utilizing but a single pair of similar transistors is readily adapted for using p-n-p transistors as illustrated in FIG. 2 with but minor changes. The changes comprise simply the reversal of polarity of diodes 14 and 19 and the polarity of voltage source 24. The circuit configuration is otherwise identical and p-n-p transistors 15′ and 20′ have their emitters connected in common to the point of common potential.

Figure 3:
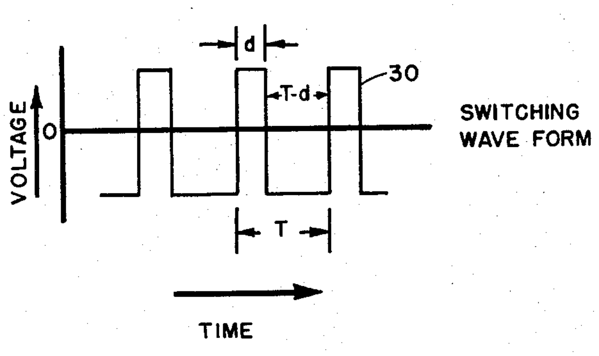
FIGS. 3 and 4 illustrate certain waveforms existing in the circuit of FIGS. 1 and 2.
Figure 4:
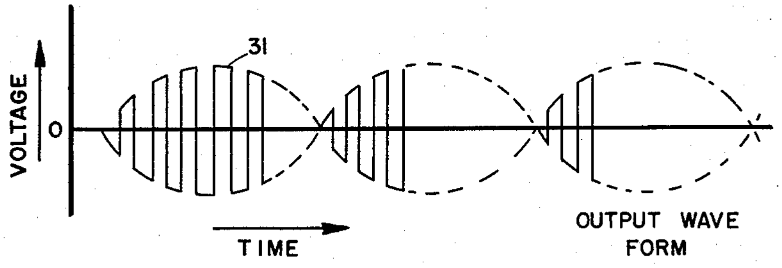

The circuits of FIGS. 1 and 2 are particularly adapted for use in circuits employing time division techniques for multiplication and division. Such an arrangement is particularly described in application, Serial No. 739,319 of Robert O. Case, Jr., filed June 2, 1958, for Electronic Computer, and assigned to the assignee of the instant application. As particularly described in the above-mentioned application of Case, the switching circuit can be utilized to multiply a first signal supplied by the external circuit 10 of FIGS. 1 and 2 in accordance with the switching voltage supplied from source 26 which has its duty cycle varied in accordance with the magnitude of the second quantity to be multiplied. FIGS. 3 and 4 illustrate this mode of operation which may utilize, for example, a switching frequency of 10 kc. and an input from source 10, for example, of 400 c.p.s. The switching signal 30 which, as illustrated in FIG. 3, varies about a fixed potential, has a period T and a duty cycle *d*, the duration of which comprises one of the quantities to be multiplied. The amplitude of the alternating-current signal from source 10 comprises the second of the quantities to be multiplied. By controlling the duration *d* from a suitable source and filtering out the switching frequency as particularly described in the above-mentioned application, the output of the circuit of FIGS. 1 and 2 will be a sinusoid with the same frequency as the input signal $e_s$ (such as 400 c.p.s.). The amplitude of the output will be proportional to the product of the magnitudes of $e_s$ and *d*. As illustrated in FIG. 4, the output waveform 31 of the circuits of FIGS. 1 and 2 will be negative when transistor 15 and diode 14 are conducting and will be positive when transistor 20 and diode 19 are conducting.

It will be readily appreciated that the above-described circuit may be utilized as a full wave phase-sensitive detector without any circuit modifications by simply utilizing a switching signal from the switching source 26 which is of the same frequency as the input signals $e_s$ and which is synchronized therewith. The detected full wave rectified output (a direct-current signal proportional to the amplitude of the input signal from source 10 and having a polarity according to the relative phases of sources 10 and 26) would again be available as illustrated in FIG. 1 from the output terminals connected to ground and to point 29. The circuit operation would be identical to that previously described except that the switching of the transistors would occur in synchronism with reversal of polarity of the input to primary 11.

Figure 5:
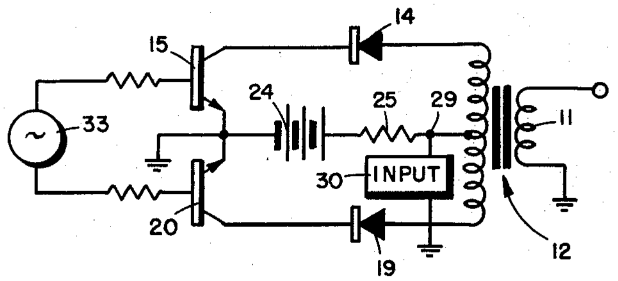
FIG. 5 illustrates connection of the circuitry of this invention for use as a modulator.

As illustrated in FIG. 5, the circuit can be utilized, again without any internal modification, as a full wave modulator. In this application, solely the external circuits have been changed. The input and output have been interchanged for operation as a modulator, while the operation of the circuit itself remains as described above. The switching signal in this instance comprises the carrier source 33 which may be sinusoidal or may remain a square wave such as that produced by the source 26 of FIGS. 1 and 2. The signal to be modulated is applied as an input 30 between ground and terminal 29, and the modulator output is provided at the terminals of the winding 11 of transformer 12. The output waveform in this modulator will then be a square wave which is symmetrical about ground if one terminal of winding 11 is ground, as illustrated, or which may be double ended if desired. The output frequency will be of the same carrier frequency as that of the switching source 33 but will have a magnitude which is directly proportional to the magnitude of the direct-current input applied between ground and terminal 29.

Figure 6:
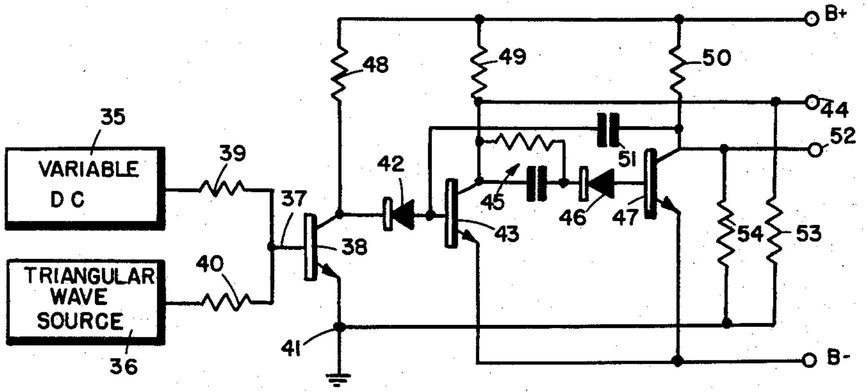
FIG. 6 illustrates details of an exemplary switching signal source.

The details of one form of the switching signal source 26 are illustrated in FIG. 6. The output of this circuit will comprise the square wave of the form illustrated in FIG. 3, having a duty cycle *d* which is proportional to one of the quantities to be multiplied. A signal proportional to a quantity to be multiplied is derived from a variable direct-current source 35 and added to the output of a triangular wave source 36 of a 10 kc. frequency, for example, at the base electrode 37 of a transistor 38 to which the sources 35 and 36 are coupled by resistors 39 and 40. Transistor 38 has its emitter connected at point 41 to the signal ground which is the point of common potential or ground of the switching circuit of FIG. 1 or FIG. 2. The collector of transistor 38 is connected via diode 42 to the base of a transistor 43 which provides a first stage of amplification. Transistor 43 has its emitter electrode connected to a suitable source of negative potential B− while its collector electrode provides one of the output terminals 44 of the switching signal source for connection, as illustrated in FIG. 1, to the base of one of the switching transistors.

The collector of the first amplifying stage 43 is coupled by means of parallel resistance-capacitance network 45 and diode 46 to the base electrode of a second transistor amplifying stage 47, having its emitter connected to the negative potential source. The collectors of transsistors 38, 43 and 47 are connected to a source of positive potential B+ through resistors 48, 49 and 50, respectively. A feedback circuit comprising a capacitor 51 is connected between the collector of the second stage 47 and the base of the first stage 43 to provide the required wave shaping by the regenerative action of the capacitor. The collector of the second stage transistor 47 provides the second output terminal 52 of the switching signal source for connection as illustrated in FIG. 1, to the other of the switching transistors. The output terminals 44 and 52 are coupled via resistors 53, 54, respectively, to the point of common potential 41 so that the push-pull output of the pulse width modulator will vary about such point of common potential. Thus, the addition of the variable direct-current signal to the triangular wave provides a pulse width output at the terminals 44 and 52 which is linearly proportional to the direct-current source 35, whereby the output of the circuit of FIG. 1, after suitable filtering, will be proportional to the product of the amplitude of the direct-current signal from source 35 and the amplitude of the alternating current signal from source 10.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A switch comprising a first winding for receiving a signal to be switched, a second winding inductively coupled with said first winding, a direct current source having a negative side connected to ground and a positive side, a resistor coupled between the positive side of said source and the center of said second winding, first and second diodes each having an anode connected to a respective end of said second winding and each having a cathode, first and second n-p-n transistors each having collector, emitter and base, the collectors of said transistors being connected to the cathodes of said diodes respectively, the emitters of said transistors being connected in common to ground, a source of switching voltage alternating about ground resistance coupled to said bases with mutually opposite polarities, said source of switching voltage having a terminal thereof connected to ground, and output terminals respectively connected to ground and the center of said second winding.

2. A switch comprising a first winding for receiving a signal to be switched, a second winding inductively coupled with said first winding, a direct current source having a positive side connected to ground and a negative side, an impedance coupled between the negative side of said source and the center of said second winding, first and second diodes each having a cathode connected to a respective end of said second winding and each having an anode, first and second p-n-p transistors each having collector, emitter and base, the collectors of said transistors being connected to the anode of said diodes respectively, the emitters of said transistors being connected in common to ground, a source of alternating voltage symmetrical about ground resistance coupled to said bases with mutually opposite polarities, said source of switching voltage having a terminal thereof connected to ground, and output terminals respectively connected to ground and the center of said second winding.

3. Apparatus of the class described comprising a first winding for receiving a signal to be switched, a second winding inductively coupled with said first winding, a direct current source having a negative side connected to ground and a positive side, an impedance coupled between the positive side of said source and the center of said second winding, first and second diodes each having an anode connected to a respective end of said second winding and each having a cathode, first and second n-p-n transistors each having collector, emitter and base, the collectors of said transistors being connected to the cathodes of said diodes respectively, the emitters of said transistors being connected in common to ground, output terminals respectively connected to ground and the center of said second winding, a source of variable potential, a triangular wave source, a third transistor having a base electrode connected to said source of variable potential and to said triangular wave source, and having an output electrode, a first stage of inverting amplification having an input from said output electrode and having an output, a second stage of inverting amplification having an input from said first stage output and having an output, a feedback circuit connected between said second stage output and said first stage input, a resistor connecting said first stage output to the base of said first transistor, and a resistor connecting said second stage output to the base of said second transistor.

4. In combination a transformer having first and second windings, means for establishing at an intermediate point of said second winding a bias voltage having a predetermined relation to a fixed potential, means for providing a pair of unidirectional current paths between the respective ends of said second winding and a common point of said fixed potential, each said path including a transistor series connected therein, a source of alternating voltage varying about said fixed potential resistance connected to said transistors with mutually opposite polarity to control conduction in said current paths, said source having one terminal thereof connected to fixed potential, an alternating current input connected to said first winding, and output means connected to said common point and said intermediate point.

5. The structure of claim 4 wherein said alternating voltage source comprises a square wave generator referenced to said fixed potential having a variable duty cycle proportional to a first quantity to be multiplied, said alternating current input having a frequency substantially less than the frequency of said alternating voltage source and having an amplitude proportional to a second quantity to be multiplied.

6. A full wave modulator comprising a transformer having first and second windings, means for establishing at an intermediate point of said second winding a bias voltage having a predetermined relation to a fixed potential, means for providing a pair of unidirectional current paths between said point and a common point of said fixed potential, each said path including a transistor series connected therein, a source of alternating voltage symmetrically varying about said fixed potential connected to said transistors with mutually opposite polarity to control conduction in said current paths, a source of signal to be modulated connected between said common point and said intermediate point, and output means coupled with said first winding.

7. A full wave transistor switch comprising a transformer having a first winding for connection to a signal to be switched and a second winding having a center tap, means for providing first and second unidirectional current paths between a point of common potential and respectively opposite ends of said second winding, bias means connected with said center tap for establishing in each said path a current bias which cancels in said second winding, each said path including a transistor biased by said bias means and having first and second switching electrodes series connected in a respective current path and having a control electrode, a switching voltage source having one terminal thereof connected to said common potential and being resistance coupled to said control electrodes with mutually opposite polarity, and output means connected between said center tap and said common potential.

References Cited in the file of this patent

UNITED STATES PATENTS

| | | |
|---|---|---|
| 2,780,782 | Bright | Feb. 5, 1957 |
| 2,808,990 | Van Allen | Oct. 8, 1957 |
| 2,809,303 | Collins | Oct. 8, 1957 |
| 2,840,726 | Hamilton | June 24, 1958 |
| 2,862,171 | Freeborn | Nov. 25, 1958 |
| 2,891,726 | Decker | June 23, 1959 |
| 2,892,103 | Scarbrough | June 23, 1959 |
| 2,900,506 | Whetter | Aug. 18, 1959 |
| 2,907,932 | Patchell | Oct. 6, 1959 |

FOREIGN PATENTS

| | | |
|---|---|---|
| 779,217 | Great Britain | July 17, 1957 |